(12) United States Patent
Kuo

(10) Patent No.: US 9,862,302 B2
(45) Date of Patent: Jan. 9, 2018

(54) COLOR TEMPERATURE CONTROL MODULE OF VEHICLE HEADLIGHT

(71) Applicant: Chun-Hsien Kuo, Miaoli County (TW)

(72) Inventor: Chun-Hsien Kuo, Miaoli County (TW)

( * ) Notice: Subject to any disclaimer, the term of this patent is extended or adjusted under 35 U.S.C. 154(b) by 0 days.

(21) Appl. No.: 15/170,391

(22) Filed: Jun. 1, 2016

(65) Prior Publication Data

US 2017/0008448 A1    Jan. 12, 2017

(30) Foreign Application Priority Data

Jul. 7, 2015   (TW) .............................. 104121998 A

(51) Int. Cl.
| | | |
|---|---|---|
| *B60Q 1/14* | (2006.01) | |
| *B60Q 1/00* | (2006.01) | |
| *B60Q 1/08* | (2006.01) | |
| *F21S 8/10* | (2006.01) | |
| *H05B 33/08* | (2006.01) | |
| *B60Q 1/20* | (2006.01) | |

(52) U.S. Cl.
CPC ......... *B60Q 1/1423* (2013.01); *B60Q 1/0023* (2013.01); *B60Q 1/0052* (2013.01); *B60Q 1/085* (2013.01); *F21S 48/115* (2013.01); *F21S 48/1131* (2013.01); *F21S 48/1747* (2013.01); *H05B 33/0854* (2013.01); *H05B 33/0872* (2013.01); *B60Q 1/20* (2013.01); *B60Q 2300/312* (2013.01); *B60Q 2300/314* (2013.01)

(58) Field of Classification Search
CPC ............ H05B 37/0218; H05B 33/0854; H05B 33/0872; H05B 33/0845; H05B 33/0869; B60Q 1/1423; B60Q 1/0023; B60Q 1/0052; B60Q 1/085; F21S 48/1131; F21S 48/115; F21S 48/1747
USPC ...................... 315/224, 247, 185 S, 291–326
See application file for complete search history.

(56) References Cited

U.S. PATENT DOCUMENTS

| | | | | |
|---|---|---|---|---|
| 6,969,183 | B2 * | 11/2005 | Okubo ................... | B60Q 1/085 315/295 |
| 7,012,384 | B2 * | 3/2006 | Tatewaki ................. | B60Q 3/80 315/312 |
| 8,274,230 | B2 | 9/2012 | Chiu | |
| 2003/0138131 | A1 * | 7/2003 | Stam ...................... | B60Q 1/085 382/104 |

(Continued)

*Primary Examiner* — Dylan White
(74) *Attorney, Agent, or Firm* — Muncy, Geissler, Olds & Lowe, P.C.

(57) ABSTRACT

A color temperature control module of a vehicle headlight, installed to a moving vehicle body, includes a light emitting element, a sensing element and an auto switching element. The light emitting element includes a low-penetration light emitting source and a high-penetration light emitting source adjacent to the low-penetration light emitting source. The sensing element senses an ambient environment of the moving vehicle body and sends a sensing signal. The auto switching element, electrically connected to the light emitting element and the sensing element, receives the sensing signal sent by the sensing element to control switching of the low-penetration light emitting source and the high-penetration light emitting source. With the low-penetration light emitting source and the high-penetration light emitting source disposed, the light emitting element is allowed to switch in coordination with changes in the ambient environment of the moving vehicle body to increase driving safety.

8 Claims, 5 Drawing Sheets

(56) References Cited

U.S. PATENT DOCUMENTS

| | | | |
|---|---|---|---|
| 2009/0073706 A1* | 3/2009 | Tatara | B60Q 1/1423 362/487 |
| 2011/0001438 A1* | 1/2011 | Chemel | H05B 37/029 315/297 |
| 2012/0299485 A1* | 11/2012 | Mohan | H05B 37/0218 315/153 |
| 2016/0185276 A1* | 6/2016 | Tanaka | B60Q 1/085 362/466 |

* cited by examiner

COLOR TEMPERATURE CONTROL MODULE OF VEHICLE HEADLIGHT

FIELD OF THE INVENTION

The present invention relates to a vehicle headlight, and particularly to a color temperature control module of a headlight.

BACKGROUND OF THE INVENTION

Automobiles are a transportation means with high mobility, and are frequently the top choice for outdoor traveling. To increase driving safety, automobiles are installed with headlights, which illuminate the road ahead and prevent rear approaching vehicles from rear-end collisions. In general, vehicle headlights are available in two choices—white light and yellow light. White light headlights provide better illumination effects at nighttime as well as better visual breadth and visibility. However, in harsh weather conditions, such as in the rain and fog, white light beams may be easily reflected due to physical optical properties, hence resulting in significantly reduced visibility. Yellow headlights, although capable of preventing severe reflection issues in conditions of the fog and rain and providing better visibility, provide less satisfactory illumination effects compared to white light headlights in general nighttime with clear skies.

To solve the above issue, in some current designs, white light is used as light sources of headlights, whereas yellow light is used as light sources of fog lights. In general nighttime with clear skies, the light sources of headlights may be used for illumination; in rainy or foggy nights, the light sources of fog lights are additionally turned on to increase visual visibility. Nonetheless, the main function of the fog lights are to assist illumination instead of entirely replacing the headlights. Moreover, with the white light headlights and yellow light fog lights simultaneously turned on when the driver drives in rainy weather, the issue that the visibility is affected by the reflection of white light by rain water still persists.

Therefore, light devices with adjustable color temperature are developed. For example, the U.S. Pat. No. 8,274,230 discloses "LED Lamp Apparatus and Method for Adjusting Color Temperature of LED Module therein". The above disclosure includes a plurality of LED strings, a plurality of drivers respectively corresponding to the LED strings, and a controller electrically connected to the drivers. The controller sends a plurality of signals to the drivers, which then modulate output currents according to the signals to adjust the color temperature of the LED strings.

However, the color temperature of the above lamp apparatus needs to be manually switched. That is, when the above lamp apparatus is used as vehicle headlights, the driver needs to manually switch the color temperature. When the ambient environment changes, in addition to paying attention to road conditions ahead, the driver also needs to manually switch the headlights, causing driver distraction and higher risks of accidents. In the event of accidental and unintentional switching under panic, for example, switching to white light having a higher color temperature in pouring rain, driving safety may also be affected. Therefore, there is a need for a solution that prevents accidents due to driver distraction and affected driving safety due to unintentionally switching vehicle headlights.

SUMMARY OF THE INVENTION

It is a primary object of the present invention to solve the issues of driver distraction from switching vehicle lights and accidents likely caused by unintentionally switching vehicle lights.

To achieve the above object, the present invention provides a color temperature control module of a vehicle headlight. The color temperature control module of a vehicle headlight, installed to a moving vehicle body, includes a light emitting element, a sensing element, and an auto switching element electrically connected between the light emitting element and the sensing element. The light emitting element includes a low-penetration light emitting source, and a high-penetration light emitting source adjacent to the low-penetration light emitting source. The sensing element senses an ambient environment of the moving vehicle body to send a sensing signal. The auto switching element receives the sensing signal sent by the sensing element, and controls switching of the low-penetration light emitting source and the high-penetration light emitting source.

In conclusion, in the present invention, the sensing element senses the ambient environment of the moving vehicle body and sends the sensing signal to the auto switching element, so as to further control the switching of the low-penetration light emitting source and the high-penetration light emitting source. Thus, not only the driver is not distracted from switching the vehicle lights but also the issue of unintentionally switching the vehicle lights is eliminated, thereby increasing driving safety and reducing the risks of accidents.

DETAILED DESCRIPTION OF THE PREFERRED EMBODIMENTS

Figure 1:
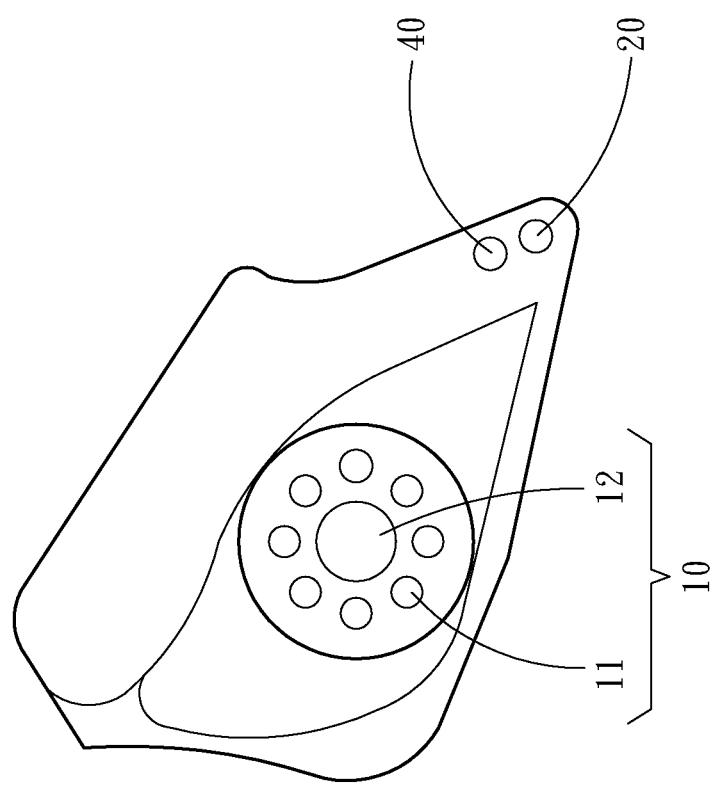
FIG. 1 is a schematic diagram of a structure of a headlight according to a first embodiment of the present invention.

Details and technical contents of the present invention are given with the accompanying drawings below.

Referring to FIG. 1 to FIG. 4, the present invention provides a color temperature control module of a vehicle headlight. The color temperature control module of a vehicle headlight, installed to a moving vehicle body 50, includes a light emitting element 10, a sensing element 20, and an auto switching element 30 electrically connected to the light emitting element 10 and the sensing element 20. The light emitting element 10 is a light emitting diode, and includes a low-penetration light emitting source 11 and a high-penetration light emitting source 12 adjacent to the low-penetration light emitting source 11. The sensing element 20 senses the ambient temperature of the moving vehicle body 50, and sends a sensing signal to the auto switching element 30. The auto switching element 30 receives the sensing signal sent by the sensing element 20 to control the switching of the low-penetration light emitting source 11 and the high-penetration light emitting source 12. Thus, while driving, not only the driver is not distracted from switching the light source, but also the disturbance of unintentionally switching the vehicle lights in a situation where the driver switches the light source under panic is eliminated, thereby increasing driving safety and reducing risks of accidents. In the embodiment, the high-penetration light emitting source 12 is located at the center, and the low-penetration light emitting source 11 in a plural quantity and surround the high-penetration light emitting source 12. Further, the sensing element 20 is disposed on the headlight of the moving vehicle body 50, and may be alternatively disposed at any position given that the ambient temperature of the moving vehicle body 50 can be sensed, e.g., the engine hood.

Figure 2:
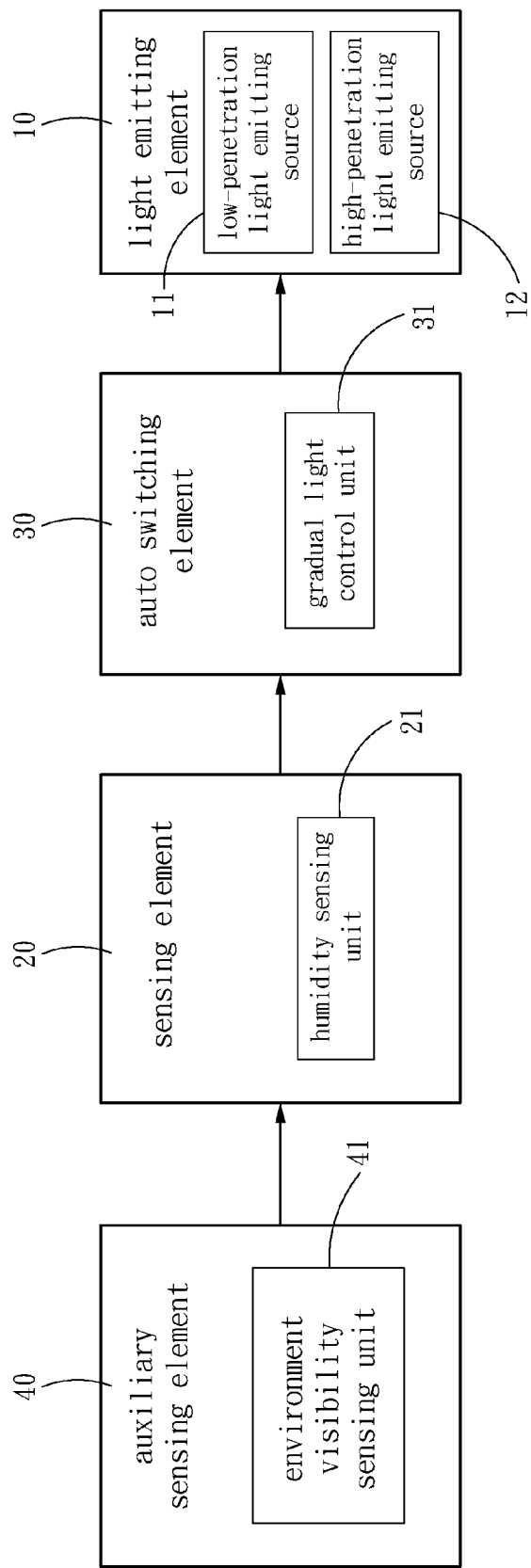
FIG. 2 is a function block diagram according to a second embodiment of the present invention.

Referring to FIG. 2 showing a function block diagram according to a second embodiment of the present invention, the sensing element 20 includes a humidity sensing unit 21 for sensing the humidity of the ambient environment of the moving vehicle body 50. When the humidity reaches an expected value, the sensing element 20 sends the sensing signal, which includes a low-penetration light switching signal and a high-penetration light switching signal. When the auto switching element 30 receives the low-penetration light switching signal, a gradual light control unit 31 in the auto switching element 30 controls the low-penetration light emitting source 11 to gradually brighten. When the low-penetration light emitting source 11 reaches a standard brightness value, the high-penetration light emitting source 12 gradually dims. When the auto switching element 30 receives the high-penetration light switching signal, the gradual light control unit 31 controls the high-penetration light emitting source 12 to gradually brighten. When the high-penetration light emitting source 12 reaches the standard brightness value, the low-penetration light emitting source 11 gradually dims. Thus, instantaneous discomfort to the eyes due to rapidly switching the low-penetration light emitting source 11 and the high-penetration light emitting source 12 and hence accidents can be prevented.

The low-penetration light emitting source 11 and the high-penetration light emitting source 12 may also simultaneously brighten and dim. That is, when the auto switching element 30 receives the low-penetration light switching signal, the gradual light control unit 31 controls the low-penetration light emitting source 11 to gradually brighten, and the high-penetration light emitting source 12 gradually dims at the same time. The switching method of the low-penetration light emitting source 11 and the high-penetration light emitting source 12 is not limited to the above examples.

This embodiment further includes an auxiliary sensing element 40 electrically connected to the sensing element 20. Only when both of the auxiliary sensing element 40 and the sensing element reach an expected value, the sensing element 20 sends the sensing signal to cause the light emitting element 10 to switch, so as to reduce the probability of detection errors. In the embodiment, the auxiliary sensing element 40 may include an environment visibility sensing unit 41 for sensing the visibility of the ambient environment.

Figure 3:
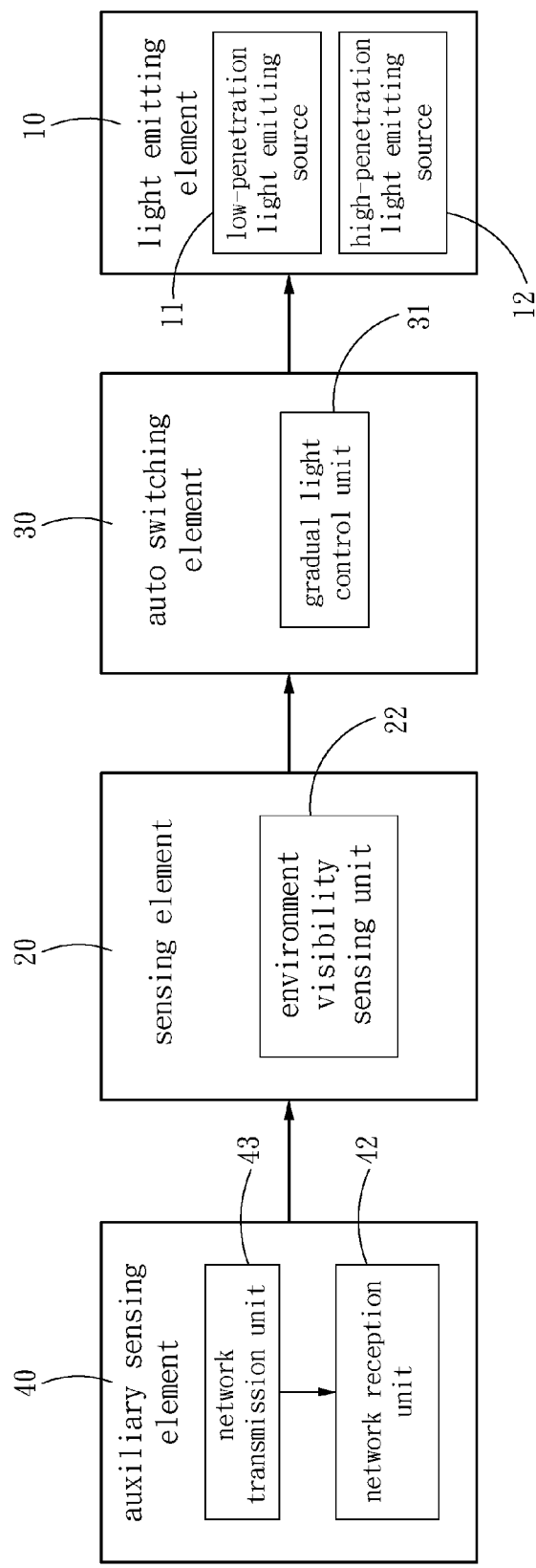
FIG. 3 is a function block diagram according to a third embodiment of the present invention.

The sensing element 20 and the auxiliary sensing element 40 are not limited being the humidity sensing unit 21 and the environment visibility sensing unit 41. Referring to FIG. 3 showing a function block diagram according to a third embodiment of the present invention, the sensing element 20 may further include an environment visibility sensing unit 22, and the auxiliary sensing element 40 may further include a network reception unit 42 and a network transmission unit 43 that coordinate with each other. The network reception unit 42 receives environment information of a location of the moving vehicle body 50 from cloud, and transmits the environment information of the location of the moving vehicle body 50 to cloud through the network transmission unit 43 to establish an environment database on a network. Thus, vehicles passing this location within a predetermined period may receive the environment information of that location of that period. By cyclically repeating the above process, each vehicle may upload and download the environment information of a passing location to form a network beneficial to all.

Figure 4:
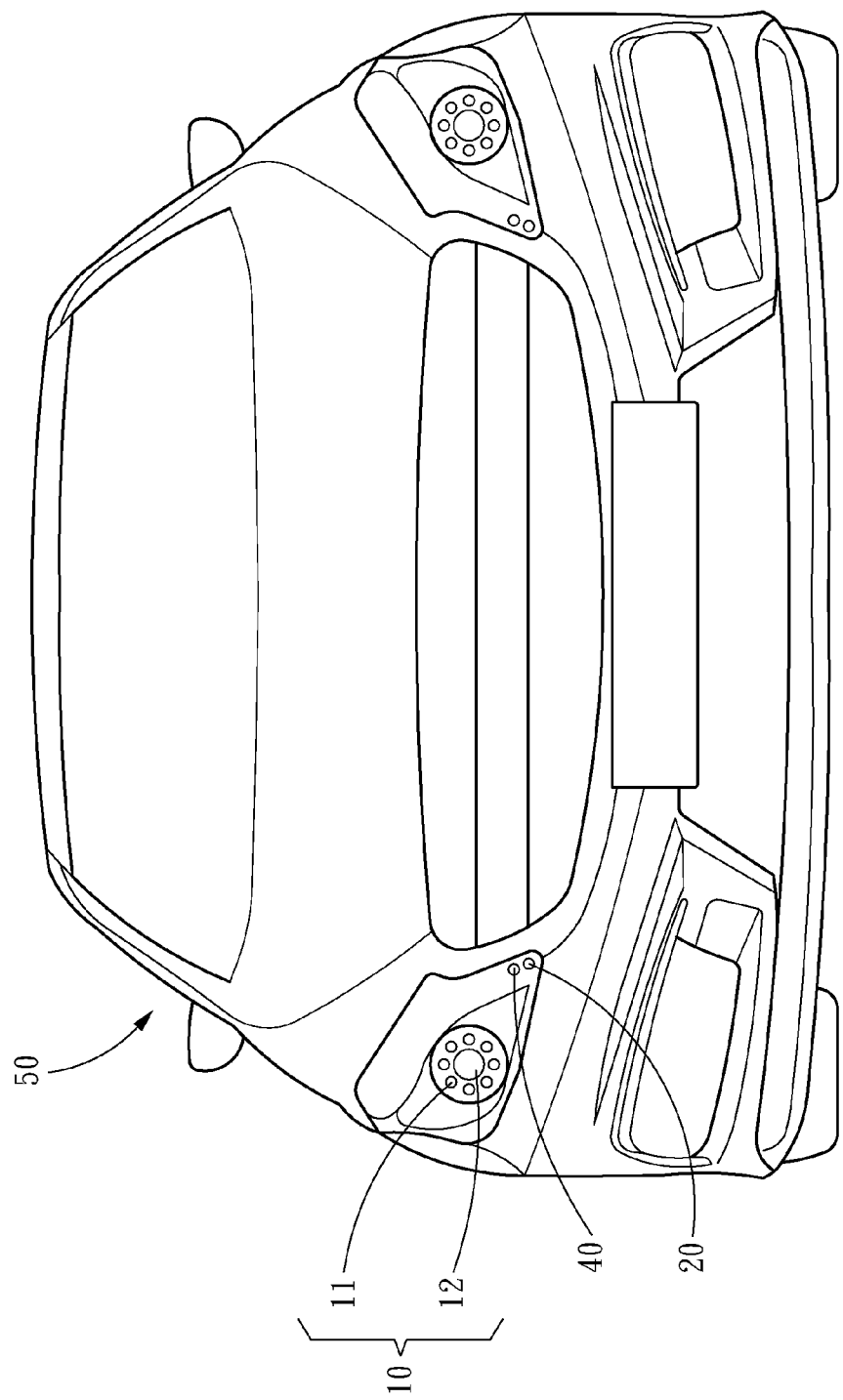
FIG. 4 is a schematic diagram of a structure of the present invention applied to a vehicle.

The auxiliary sensing element 40 assists the sensing element 20 in sensing the ambient environment of the moving vehicle body 50. For example, the humidity sensing unit 21 of the sensing element 20 and the environment visibility sensing unit 41 of the auxiliary sensing element 40 are used in coordination with each other. Alternatively, as shown in FIG. 3, the sensing element 20 includes the environment visibility sensing unit 22 instead, and the auxiliary sensing element 40 includes the network transmission unit 43 and the network reception unit 42 instead, so as to enhance the sensing accuracy and increase driving safety. It should be noted that, the coordination method is not limited to the above examples. The auxiliary sensing element 40 may be disposed around the sensing element 20. Alternatively, the auxiliary sensing element 40 and the sensing element 20 may be in plural quantities, and are disposed at a predetermined distance from one another. As shown in FIG. 4, each headlight of the moving vehicle body 50 is disposed with one auxiliary sensing element 40 and one sensing element 20. Thus, only when all of the auxiliary sensing elements 40 and the sensing elements 20 reach an expected value, the sensing signal is sent, thereby enhancing the sensing accuracy and reducing the probability of misjudgment.

Figure 5:
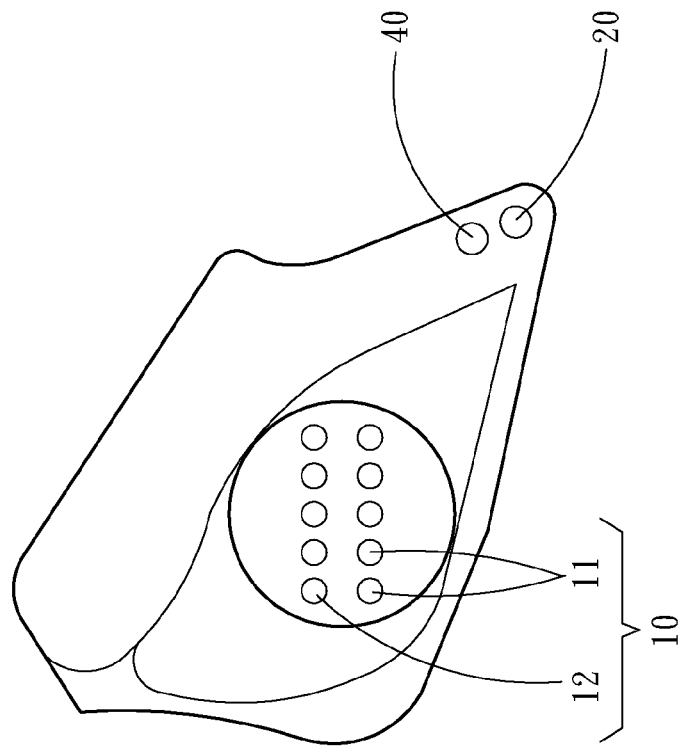
FIG. 5 is a schematic diagram of a structure according to a fourth embodiment of the present invention.
Figure 6:
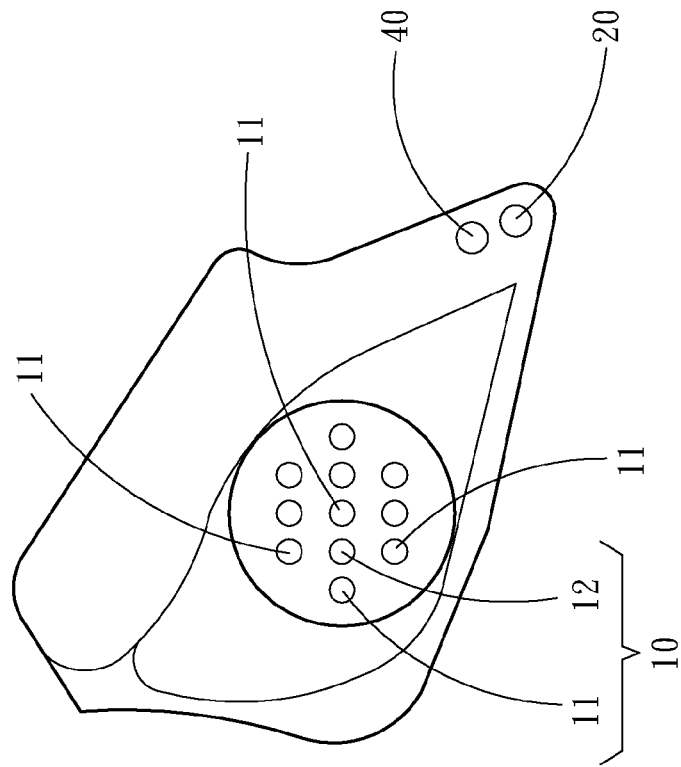
FIG. 6 is a schematic diagram of a structure according to a fifth embodiment of the present invention.

FIG. 5 and FIG. 6 show a fourth embodiment and a fifth embodiment of the present invention, respectively. In FIG. 5, the low-penetration light emitting source 11 and the high-penetration light emitting source 12 are in plural quantities, and are in a staggered arrangement. That is, each low-penetration light emitting source 11 is surrounded by the high-penetration light emitting sources 12, and each high-penetration light emitting source 12 is surrounded by the low-penetration light emitting sources 11. In FIG. 6, the low-penetration light emitting source 11 and the high-penetration light emitting source 12 are also in plural quantities, with however the low-penetration light emitting sources 11 and the high-penetration light emitting sources 12 in a top-down arrangement. The low-penetration light emitting source 11 and the high-penetration light emitting source 12 may have other arrangement methods, and are not limited to the examples above.

In conclusion, the present invention provides following features.

1. The sensing element senses the ambient environment of the moving vehicle body and sends the sensing signal to further control the low-penetration light emitting source and the high-penetration light emitting source. Thus, during driving, the driver is not distracted from switching the light source, and is free from the disturbance of unintentionally switching the vehicle lights in a situation where the driver switches the light source under panic, thereby increasing driving safety and reducing risks of accidents.

2. By controlling the low-penetration light emitting source and the high-penetration light emitting source to gradually brighten or dim using the gradual light control unit, the human eye is allowed to slowly adapt to light changes to eliminate the issue of accidents caused by the inadaptability of the human eye to sudden light source changes.

3. The auxiliary sensing element is capable of assisting the sensing unit in determination to enhance the sensing accuracy and increase driving safety.

4. With the network reception unit and the network transmission unit that coordinate with each other, the environment information sent from other vehicles is received, and is further used for assisting other vehicles to determine the ambient environment, hence forming a network beneficial to all.

5. With the auxiliary sensing element and the sensing element disposed, the sensing signal is sent only when all of the auxiliary sensing elements and the sensing elements reach an expected value. Thus, the sensing accuracy is increased, and the probability of misjudgment is reduced.

What is claimed is:

1. A color temperature control module of a vehicle headlight, installed to a moving vehicle body, comprising:
   a light emitting element, comprising a low-penetration light emitting source and a high-penetration light emitting source adjacent to the low-penetration light emitting source;
   a sensing element, sensing an ambient environment of the moving vehicle body to send a sensing signal, the sensing signal comprises a low-penetration light switching signal and a high-penetration light switching signal; and
   an auto switching element, electrically connected to the light emitting element and the sensing element, the auto switching element receiving the sensing signal sent by the sensing element to control switching of the low-penetration light emitting element and the high-penetration light emitting source, the auto switching element further including a gradual light control unit, and the auto switching element controls the low-penetration light emitting source to gradually brighten when the gradual light control unit in the auto switching element receives the low-penetration light switching signal, and controls the high-penetration light emitting source to gradually brighten when the gradual light control unit receives the high-penetration light switching signal.

2. The color temperature control module of a vehicle headlight of claim 1, wherein the light emitting element is a light emitting diode.

3. The color temperature control module of a vehicle headlight of claim 1, wherein the sensing element comprises a humidity sensing unit.

4. The color temperature control module of a vehicle headlight of claim 1, wherein the sensing element comprises an environment visibility sensing unit.

5. The color temperature control module of a vehicle headlight of claim 1, further comprising:
   an auxiliary sensing element, electrically connected to the sensing element, the auxiliary sensing element assisting the sensing element to sense the ambient environment of the moving vehicle body;
   wherein, when both of the auxiliary sensing element and the sensing element reach an expected value, the sensing element sends the sensing signal.

6. The color temperature control module of a vehicle headlight of claim 5, wherein the auxiliary sensing element comprises an environment visibility sensing unit.

7. The color temperature control module of a vehicle headlight of claim 5, wherein the auxiliary sensing element comprises a network reception unit that receives environment information of a location of the moving vehicle body from cloud.

8. The color temperature control module of a vehicle headlight of claim 7, wherein the auxiliary sensing element further comprises a network transmission unit that transmits the environment information of the location of the moving vehicle body.

* * * * *